3,766,105
COLORING OF TEXTILES AND PAPER
Kam H. Chan, Greenville, S.C., assignor to The Mearl Corporation, Ossining, N.Y.
No Drawing. Continuation-in-part of application Ser. No. 767,000, Oct. 11, 1968. This application July 22, 1971, Ser. No. 165,332
Int. Cl. C08g 9/10, 9/30
U.S. Cl. 260—15                                    5 Claims

ABSTRACT OF THE DISCLOSURE

A water-in-oil or oil-in-water emulsion containing a nacreous material, a resin, an organic solvent, water, and an emulsifying agent is employed in roller or screen printing on paper and textile fabrics.

REFERENCE TO PRIOR APPLICATION

This is a continuation-in-part of application Ser. No. 767,000, filed Oct. 11, 1968 now abandoned.

DESCRIPTION OF THE INVENTION

The present invention relates to the discovery that the application of a water-in-oil or oil-in-water emulsion containing certain specified ingredients will produce a glittering or silky effect on paper or textile fabrics.

Accordingly, it is among the objects of the present invention to provide a pigmented, nacreous printing emulsion which is useful for coloring textiles and papers. Another object of the invention is to provide colored, printed fabrics and paper having excellent heat, light and chemical resistance. Still other objects and advantages will become apparent to those of ordinary skill in the art from the following description.

In accordance with the present invention, a permanent glittering or silky effect on fabric or paper is obtained by roller printing or screen printing the fabric or paper with a nacreous pigment emulsion which can be either an oil-in-water or water-in-oil type of emulsion. The emulsions contain a nacreous pigment, a resinous material, water, an organic solvent, and an emulsifying agent.

Nacreous pigments are those which provide a pearl-like luster. The pigment particles consist of platelets of high refractive index. If as described in U.S. Pat. 1,323,485, the platelets have the appropriate index of refraction and are very uniform in thickness, i.e., such that at least about 80% of the total plate area does not differ in thickness more than ±10%, the pigments can produce color by light interference in addition to having the nacreous or pearly luster. A detailed description of nacreous pigments and the light interference thereof can be found in Greenstein, Nacreous Pigments," Encyclopedia of Polymer Science and Technology, John Wiley & Sons, Inc., 10, 193–211, 1969.

The platelets generally have lengths of about 2–100 microns and ratios of length to thickness of at least 4. The nacreous pigment can be "natural pearl essence," i.e., guanine crystals obtained from the scale or skin of fish, or synthetic materials such as bismuth oxychloride, basic lead carbonate and titanium dioxide coated mica.

The preferred nacreous pigment is titanium dioxide coated mica in which the mica particles are very smooth and preferably have specific surface areas of about 2.0–4 m.$^2$/g. as determined by the BET method and preferably having a particle size distribution such that the longest dimension of at least 80% (by number) of the particles is about 5–50 microns. The color of the pigment is determined by the thickness of the titanium dioxide coating. The nacreous pigment can be employed to give any desired color, such as green, yellow, blue, violet, orange or black with a glittering or silky effect. In general, the emulsion pigment will contain about 8–25 parts of the nacreous pigment.

When the emulsion is of the oil-in-water type, the resin employed can be a urea-formaldehyde of melamine-formaldehyde resin, which can be alkylated or preferably ethylated or butylated formaldehyde resins, or an acrylic resin. When the emulsion is of the water-in-oil type, the resin can be an alkyd or oil modified alkyd resin or formaldehyde resin or ethyl cellulose (a thermoplastic resin). A latex can also be employed such as a butadiene latex, acrylonitrile latex, acrylic latex, styrene-butadiene latex, and vinyl chloride polymer latex.

The resin constituent of the pigment emulsion can be one resin or latex or various combinations thereof. In general, the resin or latex component is from 0.5–20 parts of water an 1–75 parts of an organic solvent. The organic solvent can be an aromatic hydrocarbon such as xylene or toluene, an aliphatic petroleum solvent having a boiling point of from 110–210° C., an alcohol, turpentine, dipentene, pine oil, and the like.

For each 30–50 parts of water, the emulsion will contain 0.5–5 parts of an anionic or non-ionic emulsifying agent. Among the numerous wetting agents or dispersing agents or emulsifiers that can be employed are sodium and amino fatty acid sulfates in which the fatty acid has between 10 and 18 carbon atoms such as sodium lauryl sulfate and ethanolamine lauryl sulfate, the sodium salt of sulfonated naphthalene, naphthalene formaldehyde condensate, polyoxyethylene sorbitan stearates, sorbitan oleates and stearates, glycerol mono-oleate, polyoxyethylene sorbitan monolaurylates, polyoxyethylene sorbitan mono-oleates, polyoxyethylene sorbitan thioleates, nonyl phenyl ethylene oxides and the like.

In preparing an oil-in-water emulsion, the nacreous pigment is first dispersed in water with the aid of the wetting agent or emulsifier. The pigment slurry or dispersion is thereafter emulsified with a solution of the resin or latex component and the organic solvent. When a water-in-oil emulsion is prepared, the nacreous pigment is dispersed in the organic solvent solution of the resin component and thereafter emulsified with water and the wetting agent.

The color concentrates or emulsion pigments can be applied to paper or textiles by screen printing or roller printing and the like. The emulsions can also be used for padding if suitably modified and diluted with water.

The emulsions of this invention can also contain, if desired, supplemental agents such as antifoaming agents, crosslinking agents, thickening agents, anticrocking latexes, catalysts, plasticizers and the like. Among the thickening agents which can be used to stabilize and control the viscosity of the printing emulsions are methyl cellulose, hydroxyethyl cellulose, ammonium methacrylate, the water-soluble salts of acrylic acid and carboxy vinyl polymers. A typical material of the carboxyvinyl polymer type is "Carbopol" a water-soluble resin of the B. F. Goodrich Chemical Co. In general, 4–15 parts of the anticrocking material (30–60% solids), 0.5–4 parts of the antifoaming agent, 0.5–4 parts of the crosslinking agent, 0.5–5 parts of a catalyst, and 1–4 parts of plasticizer can be employed.

A typical oil-in-water nacreous pigment emulsion can comprise:

| | Parts by weight |
|---|---|
| Water | 20–60 |
| Emulsifier | 0.5–5 |
| Nacreous pigment | 9–20 |
| Resin in organic solvent | 2–8 |
| Organic solvent | 9–25 |
| Latex | 8–30 |
| Thickener | 1–5 |
| Crosslinking agent | 2–15 |
| Antifoaming agent | 1–4 |

A typical water-in-oil nacreous pigment emulsion can have the following ingredients:

| | Parts by weight |
|---|---|
| Water | 25–60 |
| Solvent | 1–10 |
| Resin in organic solvent | 2–8 |
| Emulsifying agent | 1–3 |
| Nacreous pigment | 8–20 |
| Latex | 8–25 |

The following examples are presented to further illustrate the invention but are not intended to limit it.

Example 1

An oil-in-water nacreous pigment emulsion was prepared by dispersing a nacreous pigment in water with the aid of emulsifying agents and thereafter a solution of the resin and latex were added followed by the anticrocking agent. Thereafter, the thickening agent and crosslinking agent were added. The ingredients and amount of each were:

| | Parts by weight |
|---|---|
| Water | 40.0 |
| Triethanolamine lauryl sulfate (emulsifier) | 1.0 |
| Sodium lauryl sulfate (dispersing agent) | 4.0 |
| Antifoaming agent (Nopco NDW) | 1.0 |
| Nacreous pigment ($TiO_2$ coated mica) | 14.0 |
| Methyl cellulose 15 cps. grade (thickening agent) | 1.5 |
| Butylated melamine-formaldehyde resin (50–60% solution in xylene and butanol) Cymel 243–3 | 4.5 |
| Xylene | 4.0 |
| Mineral spirits (Varsol No. 2, boiling range 310–380° F.) | 10.0 |
| Reactive styrene-butadiene latex (40% solids) (as binder and anticrocking agent) | 10.0 |
| Self crosslinking acrylic emulsion (45% solids) (as binder and crossing agent) Rhoplex K–3 | 10 |

Example 2

A water-in-oil emulsion was prepared by dispersing the nacreous pigment in the organic solvent solution of the resin which was then emulsified with water and emulsifiers, followed by addition of the anticrocking agent. The ingredients employed and the amounts thereof were:

| | Parts by weight |
|---|---|
| Solvesso 150 (aromatic petroleum solvent, boiling range 360–400° F.) | 43.0 |
| Medium to long oil alkyd resin solution (50–65% in mineral spirits or xylene) | 2.0 |
| Butylated melamine-formaldehyde resin (50–60% resin in xylene and butanol) | 4.0 |
| Glycerol mono-oleate (Aldo MO) | 1.0 |
| Nacreous pigment ($TiO_2$ coated mica) | 15.0 |
| Acrylonitrile latex (40% solids) Trylac 2464E | 10.0 |
| Acrylic resin emulsion (50% solids) Hycar 2600X112 | 10.0 |
| Water | 15.0 |

The emulsions of Examples 1 and 2 are applied to paper and fabrics to obtain a permanently colored glittering or silky effect on the product.

Various changes and modifications can be made in the process and products of the invention without departing from the spirit and the scope thereof. The various embodiments set forth herein were presented to further illustrate the invention but were not intended to limit it.

I claim:
1. A pigmented nacreous printing emulsion consisting essentially of:
   (a) 8–25 parts of a nacreous pigment, the particles of which are platelets of about 2–100 microns in length and having a ratio of length to thickness of at least 4;
   (b) from 0.5 to 20 parts of at least one resinous component selected from the group consisting of urea-formaldehyde resins, melamine-formaldehyde resins, acrylic resins, butadiene latexes, acrylonitrile latexes, styrene-butadiene latexes, alkyd resins, vinyl chloride polymers, and ethyl cellulose;
   (c) 10–60 parts of water;
   (d) 1–75 parts of an organic solvent selected from the group consisting of alcohols, aromatic hydrocarbons, petroleum solvents having a boiling point of 110–210° C., turpentine, dipentene and pine oil; and
   (e) 0.5–5 parts per 30–50 parts of water of an anionic or non-ionic emulsifying agent.
2. The pigmented nacreous printing emulsion of claim 1 additionally containing thickening agents, antifoaming agents, catalysts and plasticizers.
3. The pigmented nacreous printing emulsion of claim 1 wherein the resinous component is a mixture of melamine-formaldehyde resin, acrylic resin and styrene-butadiene latex.
4. The pigmented nacreous printing emulsion of claim 1 wherein the resinous component is a mixture of an alkyd resin, melamine-formaldehyde resin, acrylonitrile latex and acrylic resin.
5. The pigmented nacreous printing emulsion of claim 1 wherein the nacreous pigment is $TiO_2$ coated mica.

References Cited
UNITED STATES PATENTS

| 2,865,871 | 12/1958 | Johnson et al. | 260—22 CQ |
| 3,342,617 | 9/1967 | Jackson | 106—291 |
| 3,087,827 | 4/1963 | Klenke | 106—291 |
| 2,851,370 | 9/1958 | Blank | 117—159 |
| 3,493,410 | 3/1970 | Morita et al. | 106—291 |
| 2,825,707 | 4/1958 | Auer | 260—15 |

WILLIAM H. SHORT, Primary Examiner

E. WOODBERRY, Assistant Examiner

U.S. Cl. X.R.

106—193 J, 197 R, 288 B, 291; 117—159; 260—29.2, 29.4, 29.6, 29.7, Dig. 3